United States Patent
Scott et al.

(10) Patent No.: US 11,524,683 B2
(45) Date of Patent: Dec. 13, 2022

(54) VEHICLES, METHODS, AND DEVICES FOR VEHICLE RETARDER CONTROL AND DISPLAY

(71) Applicant: KOMATSU AMERICA CORP., Chicago, IL (US)

(72) Inventors: David J. Scott, Washington, IL (US); Sudhir Reddy Thaduru, Dunlap, IL (US)

(73) Assignee: KOMATSU AMERICA CORP., Chicago, IL (US)

( * ) Notice: Subject to any disclaimer, the term of this patent is extended or adjusted under 35 U.S.C. 154(b) by 50 days.

(21) Appl. No.: 16/788,613

(22) Filed: Feb. 12, 2020

(65) Prior Publication Data

US 2021/0245752 A1    Aug. 12, 2021

(51) Int. Cl.
*B60K 7/00* (2006.01)
*B60T 8/172* (2006.01)
*B60K 37/02* (2006.01)
*B60T 17/22* (2006.01)
*B60W 30/18* (2012.01)

(52) U.S. Cl.
CPC ..... *B60W 30/18009* (2013.01); *B60K 7/0007* (2013.01); *B60K 37/02* (2013.01); *B60T 8/172* (2013.01); *B60T 17/22* (2013.01); *B60K 2370/152* (2019.05); *B60W 2300/125* (2013.01); *B60W 2520/10* (2013.01); *B60W 2530/10* (2013.01); *B60W 2552/15* (2020.02); *B60W 2556/45* (2020.02); *B60W 2720/10* (2013.01)

(58) Field of Classification Search
CPC ....... B60W 30/18009; B60W 2556/45; B60W 2300/125; B60W 10/196; B60K 7/0007; E02F 9/2083; B60T 17/22
See application file for complete search history.

(56) References Cited

U.S. PATENT DOCUMENTS

| | | | |
|---|---|---|---|
| 6,349,997 B1 * | 2/2002 | Unterforsthuber | B60T 17/22 188/1.11 E |
| 7,034,476 B2 | 4/2006 | Wang et al. | |
| 7,308,352 B2 | 12/2007 | Wang et al. | |
| 8,635,000 B1 * | 1/2014 | Hendrickson | E02F 9/2083 701/84 |

(Continued)

*Primary Examiner* — Christian Chace
*Assistant Examiner* — Shayne M. Gilbertson
(74) *Attorney, Agent, or Firm* — Michael Best & Friedrich LLP

(57) ABSTRACT

Industrial vehicles that include a speed sensor configured to generate a speed sensor signal, a payload sensor configured to generate a payload sensor signal, an inclination sensor configured to generate an inclination sensor signal, a wheel motor connected to a wheel of the industrial vehicle, and a controller. The wheel motor includes an electric retarder device for applying a retardation force to the wheel. The controller is configured to receive the speed sensor signal, receive the payload sensor signal, receive the inclination sensor signal, determine a required retardation force for the industrial vehicle based on the payload sensor signal and the inclination sensor signal, determine an available retardation force for the industrial vehicle based on the speed sensor signal, and generate an output indicating the required retardation force for the industrial vehicle relative to the available retardation force for the industrial vehicle.

20 Claims, 12 Drawing Sheets

(56) References Cited

U.S. PATENT DOCUMENTS

| | | | |
|---|---|---|---|
| 10,173,532 B2* | 1/2019 | Nedley | B60L 50/13 |
| 10,332,396 B1* | 6/2019 | Christensen | B60W 60/0027 |
| 2005/0065693 A1* | 3/2005 | Wang | B60L 15/10 |
| | | | 701/70 |
| 2006/0069487 A1* | 3/2006 | Sychra | B60W 10/184 |
| | | | 701/69 |
| 2012/0205169 A1* | 8/2012 | Montocchio | B60T 10/02 |
| | | | 180/54.1 |
| 2013/0328675 A1* | 12/2013 | Roach | B60T 17/22 |
| | | | 340/453 |
| 2017/0015201 A1 | 1/2017 | Crosman, III et al. | |
| 2017/0210371 A1* | 7/2017 | Fraser | B60T 17/22 |
| 2018/0065629 A1* | 3/2018 | Wolff | B60W 10/08 |
| 2019/0100205 A1* | 4/2019 | Kean | B60W 50/0098 |
| 2020/0017078 A1* | 1/2020 | Perlick | B60W 10/06 |
| 2020/0223437 A1* | 7/2020 | Satou | B60W 30/162 |

* cited by examiner

VEHICLES, METHODS, AND DEVICES FOR VEHICLE RETARDER CONTROL AND DISPLAY

FIELD

Embodiments described herein relate to controlling an industrial vehicle.

BACKGROUND

Performance limits of an industrial vehicle (e.g., a heavy-duty haul or dump truck) are traditionally posted as static placards in the vehicle's cabin, such as placard 10 in FIG. 1. For example, given a particular grade of incline and a given load, the placard lists maximum continuous and/or short-term speed limits that should not be exceeded. Exceeding the stated speed limits could result in a runaway condition of the vehicle during which the vehicle may be unable to stop under its own power.

In addition to a traditional friction braking system, a device known as a retarder can be used to supplement the traditional friction braking system of a vehicle. For example, a retarder can be used to help slow the vehicle without requiring the use of the friction braking system. Because the friction braking system is used less, the service life of the friction braking system (e.g., brake pads) is extended.

SUMMARY

The placards that provide the speed limits for a vehicle, and particularly for heavy vehicles such as large dump trucks, provide only rudimentary guidance regarding how the vehicle should be operated along different road grades. For example, the placards include implicit assumptions about vehicle weight, tire size, air temperature, vehicle temperature, rolling resistance, etc. In addition to these assumptions, actual speed limits for a particular vehicle in a particular set of circumstances are also dependent upon factors such as actual road grade, next portion of road grade on a route, actual rolling resistance, air density, tire wear (i.e., change in tire radius), actual vehicle load, etc. As a result, large deviations from the placard speed limits and actual speed limits are likely.

Deviations from listed speed limits for a vehicle are particularly problematic for vehicles that implement retarders to achieve a measure of speed control. With the actual speed limit for a vehicle being unknown, or at best a rough estimate, the amount of retard force required for slowing the vehicle and avoiding the use of a friction braking system is also unknown. The result of these uncertainties is the potential that the vehicle could be traveling at a speed for which an insufficient amount of retard force is available to control. In such situations, the friction braking system would need to be used to prevent a complete vehicle runaway condition.

Conventionally, the solution to avoiding runaway situations or ensuring sufficient retard force for a given travel speed was a driver with significant skill and experience. Such an experienced driver can use their senses (e.g., sight, feel, sound, etc.) and driving skill (e.g., steering path, brake application, etc.) to keep the vehicle within the retard force limitations. However, even with an experienced and skilled driver, the actual truck speed limit is unknown. The margin between the available retard force and required retard force is also unknown.

Embodiments described herein provide vehicles, methods, and devices that provide more effective and efficient control of an industrial vehicle with respect to required and available retardation forces. As a result, the conventional dependence upon highly-skilled and experienced drivers is reduced. For example, a controller associated with an industrial vehicle can receive information or signals from a plurality of sensors associated with the industrial vehicle. Based on those signals and related information, the controller is configured determine an amount of retardation force that is currently required (or may be required in the future). The controller is also configured to determine an amount of available retardation force based on a current operational state of the industrial vehicle. Based on these determined values, the controller is configured to generate an output or display that effectively and efficiently conveys the determined values for retardation force to an operator in a relative manner. By visually representing an available retardation force with respect to or relative to a required retardation force, an operator is able to quickly assess whether the industrial vehicle is approaching or in a potential runaway state. The controller can generate such a display along with traditional vehicle display elements, such as a speedometer needle. Therefore, from a straightforward and easy to understand display, an operator is able to control the industrial vehicle such that the amount of required retardation force does not exceed the amount of available retardation force. As a result, the friction braking system of the industrial vehicle will be used less and the service life of the friction braking system can be increased.

Industrial vehicles described herein include a speed sensor configured to generate a speed sensor signal, a payload sensor configured to generate a payload sensor signal, an inclination sensor configured to generate an inclination sensor signal, a wheel motor connected to a wheel of the industrial vehicle, and a controller. The wheel motor includes an electric retarder device for applying a retardation force to the wheel. The controller is connected to the speed sensor, the payload sensor, the inclination sensor, and the wheel motor. The controller is configured to receive the speed sensor signal, receive the payload sensor signal, receive the inclination sensor signal, determine a required retardation force for the industrial vehicle based on the payload sensor signal and the inclination sensor signal, determine an available retardation force for the industrial vehicle based on the speed sensor signal, and generate an output indicating the required retardation force for the industrial vehicle relative to the available retardation force for the industrial vehicle.

Methods described herein provide for operational control of an industrial vehicle. The methods included receiving a speed sensor signal from a speed sensor, receiving a payload sensor signal from a payload sensor, receiving an inclination sensor signal from an inclination sensor, determining a required retardation force for the industrial vehicle based on the payload sensor signal and the inclination sensor signal, determining an available retardation force for the industrial vehicle based on the speed sensor signal, and generating an output indicating the required retardation force for the industrial vehicle relative to the available retardation force for the industrial vehicle.

Computing systems described herein provide for operational control of an industrial vehicle. The computing system is configured to receive a speed sensor signal from a speed sensor, receive a payload sensor signal from a payload sensor, receive an inclination sensor signal from an inclination sensor, determine a required retardation force for the industrial vehicle based on the payload sensor signal and the inclination sensor signal, determine an available retardation force for the industrial vehicle based on the speed sensor signal, and generate an output indicating the required retardation force for the industrial vehicle relative to the available retardation force for the industrial vehicle.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein relate to vehicles, methods, and devices that provide control of an industrial vehicle based on required and available retardation forces. A controller associated with an industrial vehicle is configured to receive output signals from a plurality of sensors associated with the industrial vehicle, such as a speed sensor, an inclination sensor, a payload sensor, etc. Based on the output signals from these sensors, the controller is configured determine an amount of retardation force that is currently required by the industrial vehicle. The controller is also configured to determine an amount of available retardation force based on a current operational state of the industrial vehicle. The controller is then configured to generate an output or display that indicates, among other things, the required retardation force and the available retardation force relative to one another. The display also indicates, for example, a current travel speed of the industrial vehicle, a target retardation force for the vehicle, and warnings associated with the required retardation force. In addition to generating a display related to controlling retardation force for the industrial vehicle, the controller is also configured to control the industrial vehicle based on the required retardation force of the industrial vehicle. For example, if the required retardation force is approaching the maximum available retardation force, the controller can take an action (e.g., reduce pedal depression, apply retardation force, apply friction braking system, etc.) to prevent the required retardation force from exceeding the available retardation force. These display and control techniques can be implemented in a variety of industrial vehicles, such as dump trucks.

Figure 1:
FIG. 1 illustrates a performance limits placard.
Figure 1:
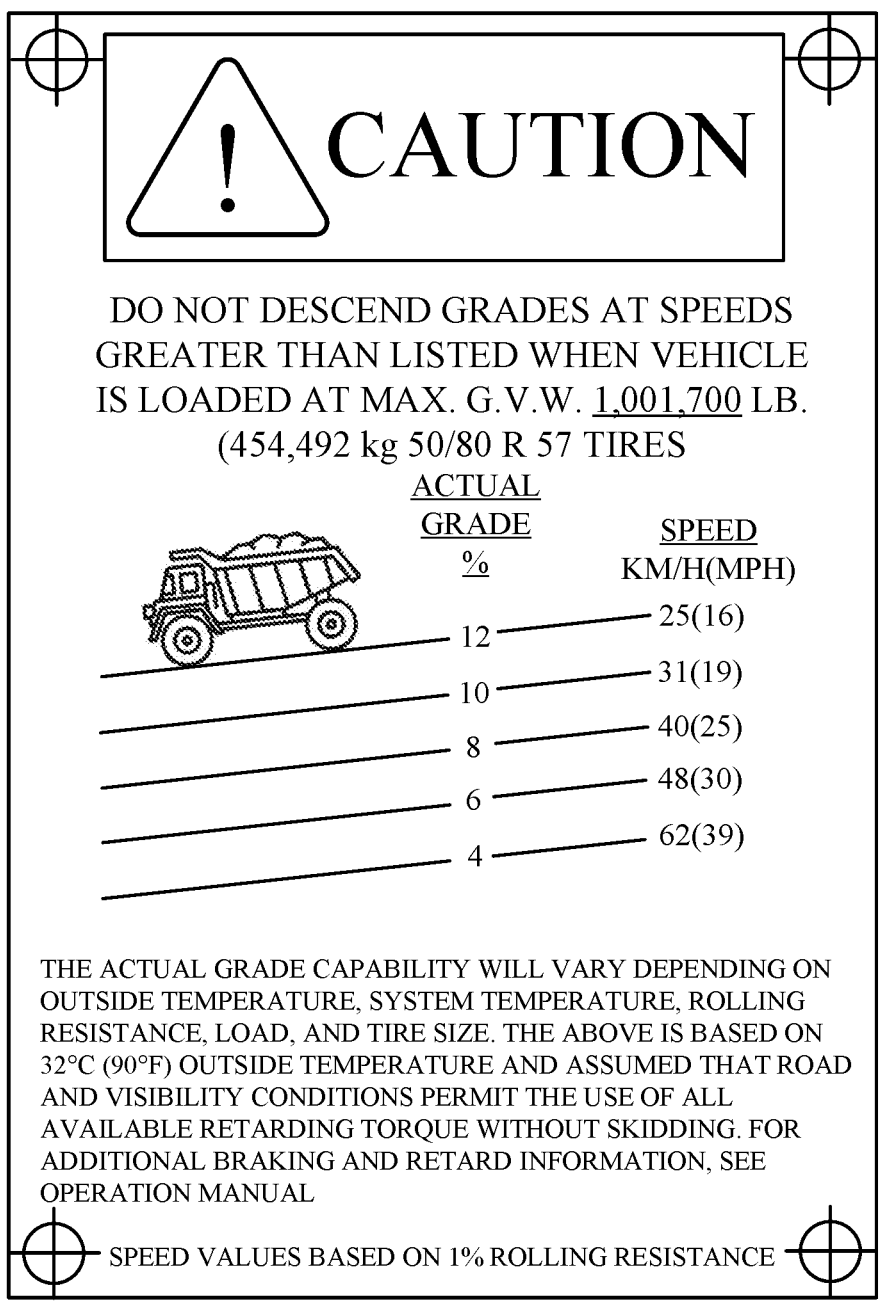
Figure 2A:
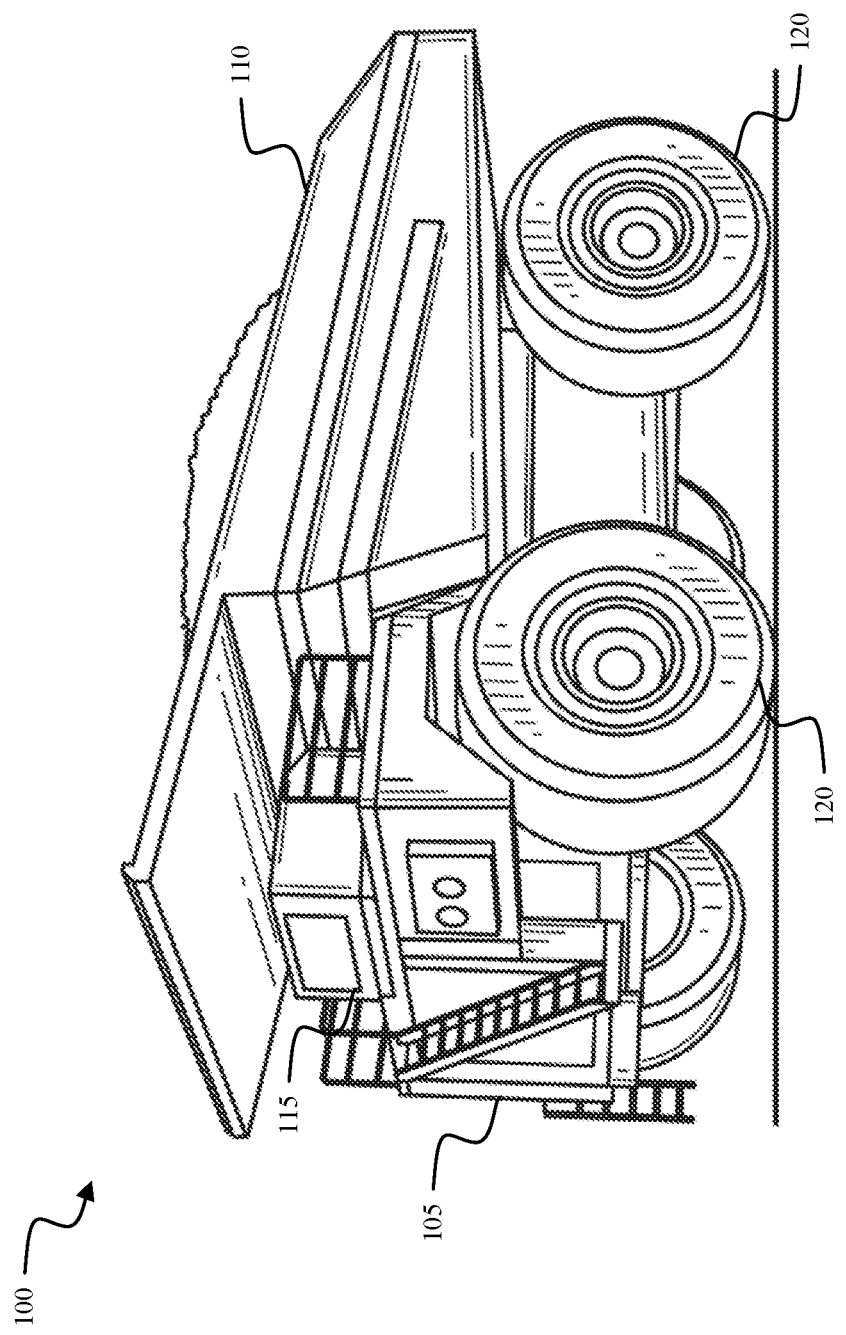
FIG. 2A illustrates a vehicle, such as a dump truck.

FIG. 2A illustrates an industrial vehicle 100. The vehicle 100 includes, among other things, a body 105, a bed 110, a cab 115, and a plurality of wheels 120. The vehicle 100 also includes, for example, a retarder speed control system that is operable to assist a driver with speed control based on the grade of a road. In some embodiments, the retarder speed control system is configured to operate in an automatic manner, as described in greater detail below.

Figure 2B:
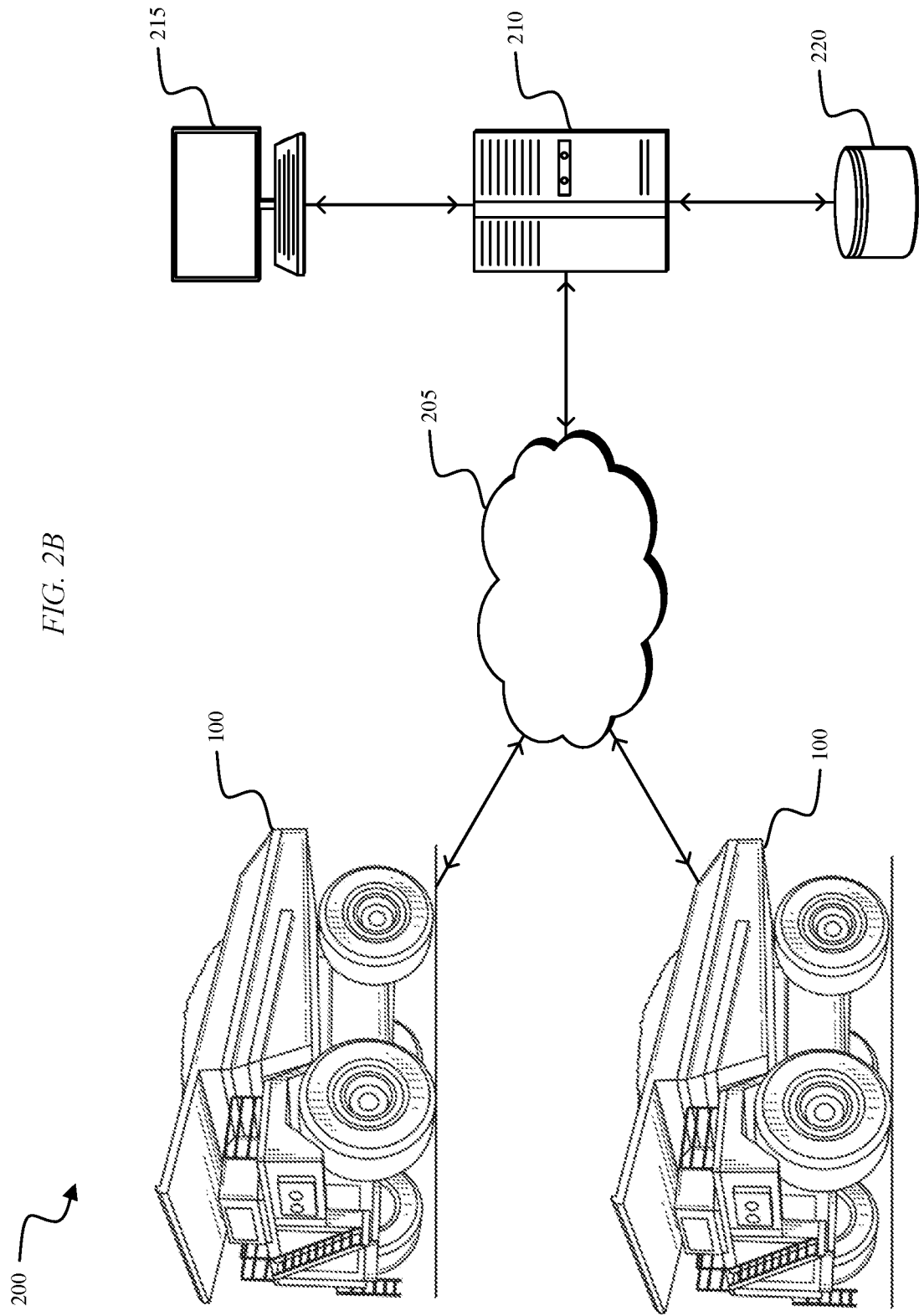
FIG. 2B illustrates a control network for a plurality of the vehicles of FIG. 2A.

FIG. 2B illustrates a system 200 that includes a plurality of vehicles 100, a communication network 205, a server 210, a workstation 215, and a database 220. Each of the vehicles 100 is configured to communicatively connect to the server 210 through the network 205 and provide information to the server 210 related to operational characteristics or values for operational characteristics of the vehicles 100. The vehicles 100 can also, for example, receive one or more control signals from the server 210 over the network 205 for controlling one or more operations of the vehicles 100. The operational characteristics of the vehicles 100 include information from sensor signal outputs, user input controls, fixed vehicle characteristics, etc. The information from sensor output signals includes, for example, sensed suspension forces (e.g., using a load sensor), vehicle angle of incline (e.g., from an inclinometer), vehicle speed (e.g., from a speed sensor), etc. The operational characteristics received from the vehicles 100 at the server 210 can be stored in the database 220. When the vehicles 100 are implemented in the system 200, the vehicles are capable of being operated in any of a manual operational mode, a semi-autonomous operational mode, and a fully-autonomous operational mode, as described in greater detail below.

The network 205 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the network 205 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 3:
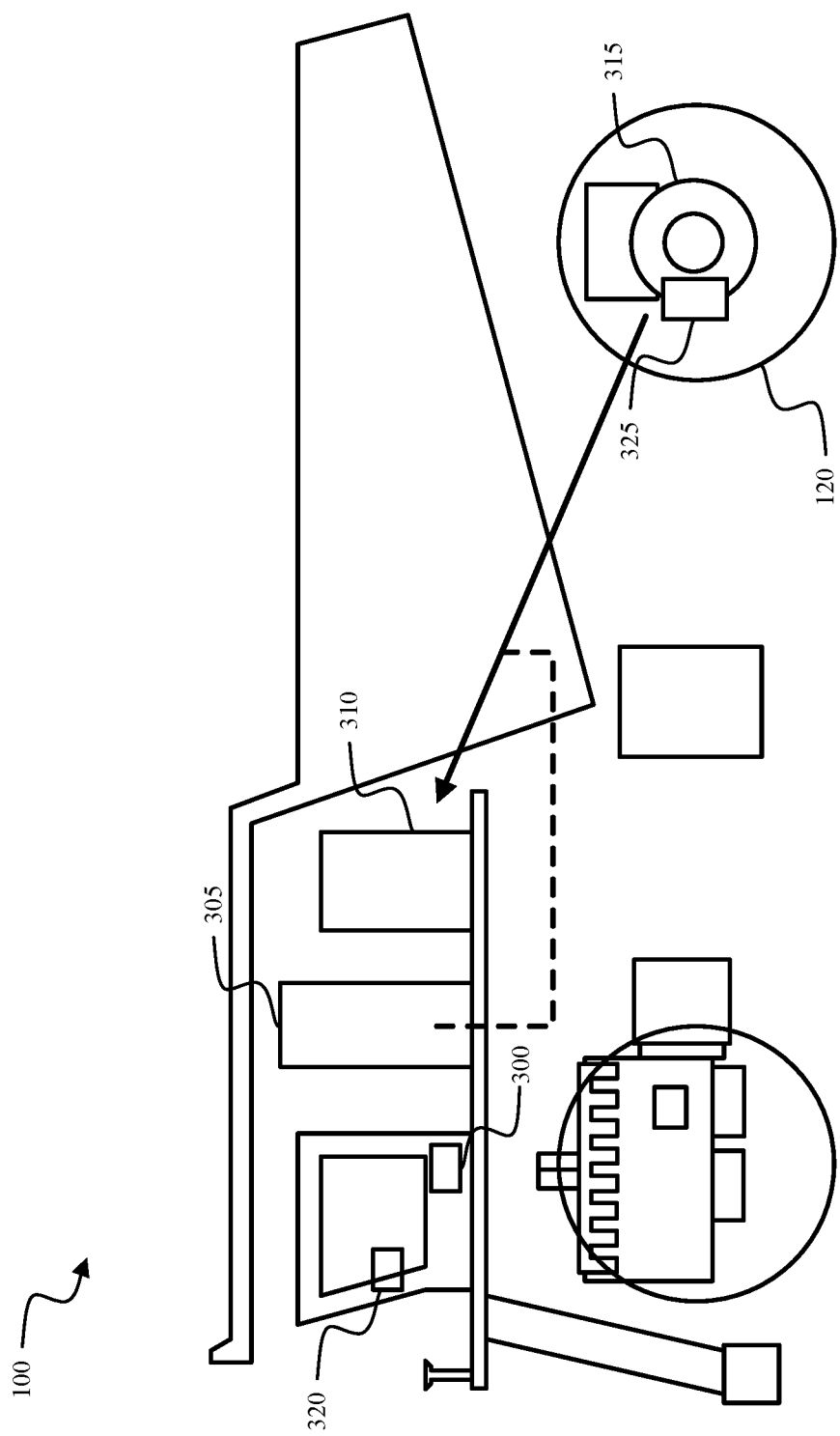
FIG. 3 illustrates a schematic diagram of the vehicle of FIG. 2A.

FIG. 3 is a generalized schematic illustration of the vehicle 100. As shown in FIG. 3, the vehicle 100 includes a system controller 300, a drive system controller 305, a retarder grid 310, a wheel motor 315, and a vehicle display 320. The system controller 300 can be connected to the drive system controller 305 for controlling driving or propulsion of the vehicle 100 based on various sensor inputs to the system controller 300. For example, the system controller 300 is connected to a variety of sensors, such as speed sensors, inclination sensors, payload sensors (e.g., such as the Komatsu Payload Meter III®), etc. Based on output signals from the various sensors, the system controller 300 or the drive system controller 305 is configured to control, among other things, the application of retardation forces for slowing down the vehicle 100 (e.g., when travelling down a decline). The retarder grid 310 is, for example, a bank of resistors that is configured to dissipate electrical energy (i.e., in the form of heat) that is generated during a retardation operation. The wheel motor 315 is illustrated in FIG. 3 with respect to wheel 120. However, in some embodiments, each wheel 120 of the vehicle 100 includes a wheel motor 315 and each wheel 120 of the vehicle 100 is capable of being independently driven. In such embodiments, the system controller 300 and the drive system controller 305 are configured to independently control propulsion effort and retarding effort for each wheel 120. In some embodiments, propulsion and retarding efforts are controlled to maintain a constant speed for the vehicle 100. The drive system controller 305 is also configured to control a friction braking system 325 for the vehicle 100. In some embodiments, the friction braking system includes four-wheel, hydraulically actuated, oil-cooled brakes.

The wheel motor 315 includes a dynamic electric retarder device for applying a retardation force or effort to an axle of the vehicle 100. In some embodiments, the electric retarder device includes a rotor attached the axle and a stator secured to the vehicle 100's chassis. When a retardation force is to be applied, electric power is provided to the stator to produce a magnetic field. As the rotor rotates through the magnetic field, current is induced in the rotor. An opposing magnetic field then slows the rotation of the rotor. Current generated by the retarding operation can be dissipated using the retarder grid 310. In some embodiments, regenerative braking can be used to charge a battery bank or power supply of the vehicle 100.

Figure 4:
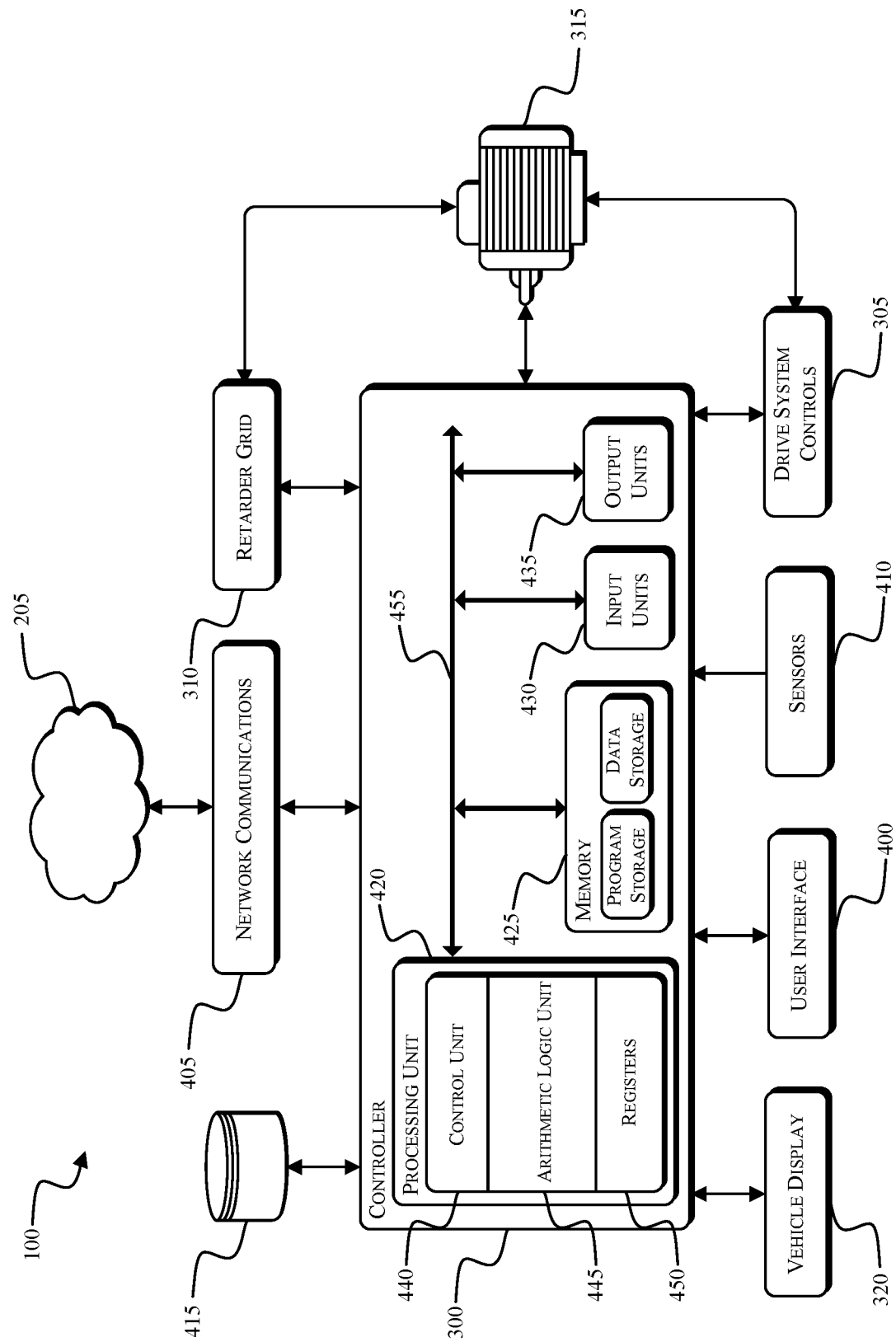
FIG. 4 illustrates a control system for the vehicle of FIG. 2A.

FIG. 4 illustrates the controller 300 for the vehicle 100. The controller 300 is electrically and/or communicatively connected to a variety of modules or components of the vehicle 100. For example, the illustrated controller 300 is connected to the drive system controller 305, the retarder grid 310, the wheel motor 315, the vehicle display 320 (e.g., a liquid crystal display ["LCD"], etc.), a user interface 400, a network communications module 405, a plurality of sensors 410, and an external memory or database 415. The network communications module 405 is connected to the network 205 to enable the controller 300 to communicate with the server 210. The sensors 410 include, for example, one or more speed sensors, one or more inclination sensors, one or more payload sensors, etc. Each of the sensors 410 generates one or more output signals that are provided to the controller 300 for processing and evaluation.

The controller 300 includes combinations of hardware and software that are operable to, among other things, control the operation of the vehicle 100, communicate over the network 205, receive input from a user via the user interface 400, provide information to a user via the vehicle display 320, etc. The controller 300 includes a plurality of electrical and electronic components that provide power, operational control, and protection to the components and modules within the controller 300 and/or the vehicle 100. For example, the controller 300 includes, among other things, a processing unit 420 (e.g., a microprocessor, a microcontroller, an electronic processor, an electronic controller, or another suitable programmable device), a memory 425, input units 430, and output units 435. The processing unit 420 includes, among other things, a control unit 440, an arithmetic logic unit ("ALU") 445, and a plurality of registers 450 (shown as a group of registers in FIG. 4), and is implemented using a known computer architecture (e.g., a modified Harvard architecture, a von Neumann architecture, etc.). The processing unit 420, the memory 425, the input units 430, and the output units 435, as well as the various modules or circuits connected to the controller 300 are connected by one or more control and/or data buses (e.g., common bus 455). The control and/or data buses are shown generally in FIG. 4 for illustrative purposes. Although the controller 300 is illustrated in FIG. 4 as one controller, the controller 300 could also include multiple controllers configured to work together to achieve a desired level of control for the vehicle 100. As such, any control functions and processes described herein with respect to the controller 300 could also be performed by two or more controllers functioning in a distributed manner.

The memory 425 is a non-transitory computer readable medium and includes, for example, a program storage area and a data storage area. The program storage area and the data storage area can include combinations of different types of memory, such as a read only memory ("ROM"), a random access memory ("RAM") (e.g., dynamic RAM ["DRAM"], synchronous DRAM ["SDRAM"], etc.), electrically-erasable programmable ROM ("EEPROM"), flash memory, a hard disk, an SD card, or other suitable magnetic, optical, physical, or electronic memory devices. The processing unit 420 is connected to the memory 425 and is configured to execute software instructions that are capable of being stored in a RAM of the memory 425 (e.g., during execution), a ROM of the memory 425 (e.g., on a generally permanent basis), or another non-transitory computer readable medium such as another memory or a disc. Software included in the implementation of the vehicle 100 and controller 300 can be stored in the memory 425 of the controller 300. The software includes, for example, firmware, one or more applications, program data, filters, rules, one or more program modules, and other executable instructions. The controller 300 is configured to retrieve from the memory 425 and execute, among other things, instructions related to the control processes and methods described herein. In other embodiments, the controller 300 includes additional, fewer, or different components.

The user interface 400 is included to provide user control of the vehicle 100. The user interface 400 is operably coupled to the controller 300 to control, for example, drive signals provided to the drive system controller 305, the wheel motor 315, etc. The user interface 400 can include any combination of digital and analog input devices required to achieve a desired level of control for the vehicle 100. For example, the user interface 400 can include a computer having a display and input devices, a touchscreen display, a plurality of knobs, a plurality of dials, a plurality of switches, a plurality of buttons, a plurality of faders, a plurality of joysticks, or the like. In some embodiments, the user interface 400 is integrated with the vehicle display 320 (e.g., as a touchscreen display).

The network communications module 405 is configured to communicate over the network 205 with other network connected devices, such as the server 210, the workstation 215, and/or the database 220. In some embodiments, the controller 300 is configured to transmit information to the server 210 related to the operational parameters or characteristics of the vehicle 100. For example, the information includes payload information, speed information, incline/decline information, fuel consumption information, alarm information, etc. The database 415 is similar to the database 220 and can store information related to the operational parameters or characteristics of the vehicle 100. The server 210 can be configured to remotely monitor the operation of the vehicle and identify, for example, when service on the vehicle 100 may be required or warranted. In some embodiments, the server communicates control signals back to the vehicle 100 for controlling the operation of the vehicle 100. For example, the vehicle 100 can be configured as an autonomous or semi-autonomous vehicle that does not require an in-cab operator. In other embodiments, a remote operator working from the workstation 215 controls the operation of the vehicle 100. In such embodiments, the workstation 215 is set up similar to the cab of the vehicle 100 and cameras are used to present the remote operator with a field-of-view around the vehicle 100.

Figure 5:
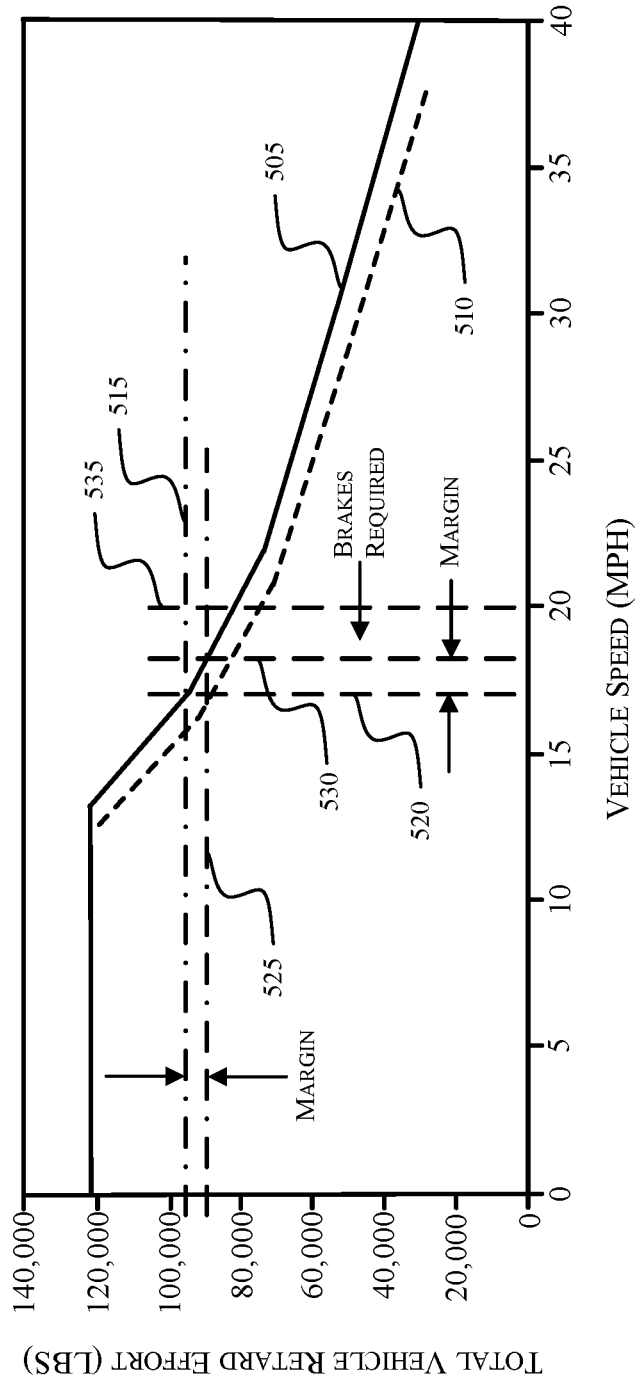
FIG. 5 is a graph of total retard effort versus vehicle speed.

FIG. 5 is a graph 500 of retardation effort versus vehicle speed. The graph 500 indicates the amount of force (e.g., in pounds, foot-pounds, kilo-Watts, etc.) that can be put to the ground for a given travel speed of the vehicle (e.g., in miles-per hour, kilometers-per hour, feet-per second, etc.). The solid black line 505 corresponds to the retard effort that could be put to the ground for a given travel speed and at a 100% pedal depression. The 100% pedal depression line 505 and the associated values for retardation effort correspond to values that will maintain the vehicle 100 at a constant speed (i.e., not accelerating). The dashed black line 510 corresponds to the retard effort required for a 90% pedal depression. For a given percentage of pedal depression, the graph 500 illustrates the available retardation effort that should be available and a margin between the retardation effort that should be available and the amount of retardation effort that is required. For example, the dot-dash line 515 represents the amount of retardation force that can be put to the ground for a vehicle travel speed of approximately 17 miles-per hour (dashed line 520). For a 90% pedal depression and also a vehicle travel speed of approximately 17 miles-per hour, the required amount of retardation effort is represented by the dot-dash-dash line 525. The difference between the available retardation effort and the required retardation effort is represented as a margin between the dot-dash line 515 and the dot-dash-dash line 525. Similarly, for a vehicle travel speed of approximately 17 miles-per hour and a 90% pedal depression, a second margin also exists between the amount of retardation force that can be put to the ground when the vehicle 100 is traveling faster (e.g., approximately 18 miles-per hour). The second margin is illustrated between dashed line 520 and dashed line 530. As such, the margin between the amount of retardation force that can be put to the ground for the vehicle 100 and the amount of required retardation force can be taken up by either an increase in travel speed (e.g., travelling down a decline) or an increase in pedal percentage. In some embodiments, the maximum speed for the vehicle 100 from propulsion alone is dependent upon the payload of the vehicle at a given time. Exceeding the maximum speed for the vehicle 100 would then require, for example, the vehicle to be travelling down an decline.

In the event that the speed of the vehicle 100 increases to approximately 20 miles-per hour for either a 90% pedal or a 100% pedal (dashed line 535), the travel speed of the vehicle 100 will have exceeded the available retardation force that can be put to the ground for either the 90% pedal or the 100% pedal for a given payload. In such an instance, there is insufficient retardation effort available to the vehicle 100 to maintain control of the vehicle (i.e., prevent acceleration) and prevent a runaway condition of the vehicle 100. The friction braking system could then be used to slow down the vehicle 100 to a speed where sufficient retardation effort is again available.

The controller 300 can compare points along the graph 500 for an amount of available retardation effort to an equivalent road grade effect force (e.g., a required retardation effort) to determine whether sufficient retardation effort is available to the vehicle 100. The controller 300 uses output signals from the sensors 410, such as a payload sensor, an inclinometer, a speed sensor, etc. In some embodiments, the controller 300 uses the geometry of the vehicle 100, suspension forces, and angle of incline to determine a payload of the vehicle. Using the payload of the vehicle, the speed of the vehicle, pedal depression percentage, the grade angle of the road, etc., various operational characteristics of the vehicle 100 can be determined and displayed to a user.

For example, for a given pedal percentage and travel speed of the vehicle 100, an available retardation effort can be determined (e.g., using the graph 500). The equivalent road grade effect force forward on the vehicle 100 can be determined for a given vehicle payload using EQN. 1 below:

$$(m \times a_g) \times \sin(\alpha) - \text{force(roll \%)} \qquad \text{EQN. 1}$$

where a value for alpha, a, can be determined using a sensor (e.g., an inclination sensor) of the vehicle 100, vehicle mass, m, is determined using a payload meter sensor, and force (roll %) is a rolling resistance that is set to a value of approximately 1% to 3% (e.g., depending on vehicle 100, the ground surface, etc.) In some embodiments, the payload meter sensor is used by the controller 300 to determine a variety of other characteristics of the vehicle 100, such as haul cycle, loading, and dumping times, distance traveled, maximum speeds, average speeds, etc. The acceleration of the vehicle 100 corresponds to the equivalent road grade effect force forward divided by the vehicle 100's mass. When the retardation force available to slow the vehicle 100 for the given pedal percentage and vehicle speed is greater than the calculated equivalent road grade effect force forward, the retardation effort is capable of slowing the vehicle 100 at a particular rate. When the retardation force available to slow the vehicle 100 for the given pedal percentage and vehicle speed is less than the calculated equivalent road grade effect force forward, the available retardation effort is not capable of slowing the vehicle 100. In some embodiments, the controller 300 determines a retardation effort to apply to the wheel motor 315 based on a desirable, achievable, or predetermined deceleration for the vehicle 100.

The calculations described above and the graph 500 of FIG. 5 can be used to determine if sufficient retardation effort is available to the vehicle 100 to prevent the vehicle 100 from accelerating and requiring the use of the friction braking system. However, while operating the vehicle 100, performing calculations and checking graphs is a particularly inefficient and ineffective manner of conveying or determining information. A more effective technique and a more efficient interface for conveying information to a user related to required retardation effort would greatly enhance an operator's ability to safely operate the vehicle 100.

Figure 6:
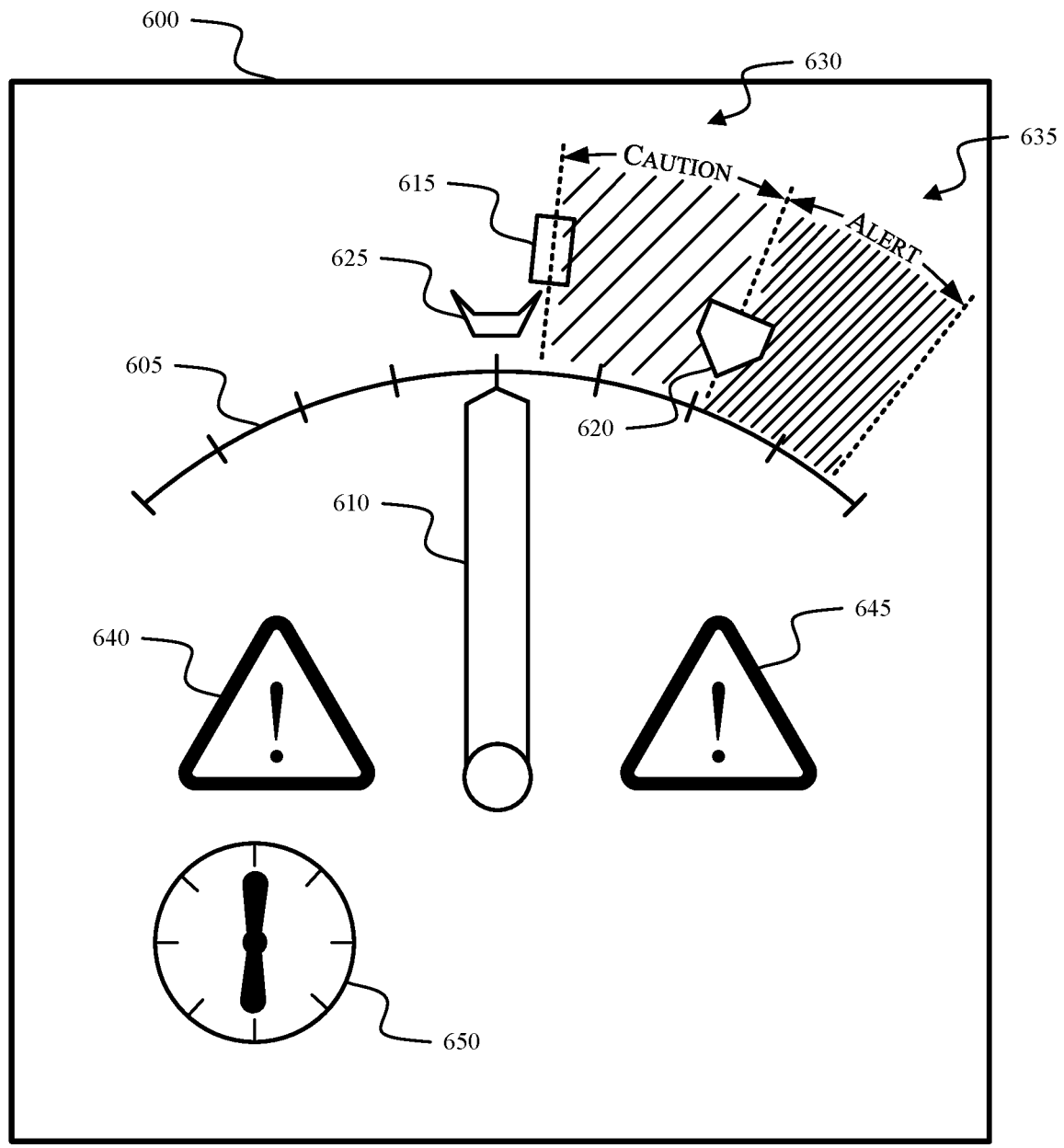
FIG. 6 illustrates a display for the vehicle of FIG. 2A.

FIG. 6 illustrates an embodiment of a display 600 that more efficiently conveys the operational state of the vehicle 100 to an operator of the vehicle 100. Particularly, the display 600 provides a convenient and effective interface for a user to understand how much retardation effort is required for a given operational state of the vehicle 100, and how close the vehicle 100 is to demanding more retardation effort than the vehicle 100 is able to provide. The display 600 includes a speed graph 605 that is used to indicate a current travel speed of the vehicle 100. The current travel speed of the vehicle 100 is indicated using a speedometer needle 610. A target speed indicator 615 illustrates a real-time or substantially real-time system target optimum value for retardation effort needed to prevent the vehicle 100 from accelerating. The target optimum value is dynamically determined and controlled relative to the machine performance speed graph 605 based on, for example, payload value and resultant machine weight, angle of grade input for the vehicle 100, and other available machine performance factors (e.g., air temperature, moisture content of air, haul road friction loss, etc.). For example, at a dynamically determined resultant margin with respect to 100% retardation effort capacity, the target speed indicator 615 moves with respect to or relative to the speed graph 605 as the conditions of the vehicle 100 (e.g., speed, payload, road grade, and/or other conditions of system performance) change in real-time or substantially-real time.

The speed resultant for 100% retardation effort capacity for the vehicle 100 in real-time or substantially real-time is indicated using the arrow indicator 620. Like the target speed indicator 615, the arrow indicator 620 also moves with respect to or relative to the speed graph 605 as the speed and/or payload of the vehicle 100 change. A retarding performance indicator 625 corresponds to a system actuation state. The system actuation state corresponds to a dynamically-calculated zero acceleration speed for the current conditions of the vehicle 100 (e.g., including retarding command level) in real-time or substantially real-time (i.e., the resultant speed which could be maintained for the operator commanded level of retarding effort for the vehicle 100). The retarding performance indicator 625 also moves relative to the speed graph 605 as the corresponding operation environment and conditions of the vehicle 100 change. In a desirable operational state of the vehicle 100, the retarding performance indicator 625 and the target speed indicator 615 align with one another, and the required retardation effort for the vehicle 100 is operating precisely at the predetermined margin below the maximum available retardation effort of the vehicle 100. Such alignment ensures that the vehicle 100 can be controlled using additional retarding capability during short durations when more retarding capability may be necessary for ceasing acceleration and decelerating to the optimal target speed indicated by the target speed indicator 615.

If the retarding performance indicator 625 moves to the left (i.e., counter-clockwise rotation) with respect to the target speed indicator 615, the retarding performance resultant speed shown by retarding performance indicator 625 is slower than the actual speed of the vehicle 100. As a result, the vehicle 100's speed will increase (acceleration), which is indicated by the speedometer needle 610 moving to the right (i.e., clockwise rotation). In the illustrated embodiment, the display 600 includes a caution zone 630 and a warning or alert zone 635. The position of the caution zone 630 and the alert zone 635 can be determined by the controller 300 based on the position of the arrow indicator 620. For example, the boundary between the caution zone 630 and the alert zone 635 can correspond to the current location of the arrow indicator 620. In some embodiments, the caution zone 630 is illuminated yellow in the display 600 to warn an operator where the caution zone 630 is located with respect to the speedometer needle 610. If the retarding performance indicator 625 moves to the left (i.e., counter-clockwise rotation) in FIG. 6 and away from the target speed indicator 615 while the commanded input to the retarder system is a full 100% retarding command, the vehicle 100 is experiencing lower than expected system performance relative to the speed performance graph 500. In such a circumstance, a caution warning 640 can be illuminated. In some embodiments, the caution warning 640 is also illuminated when the speedometer needle 610 reaches the caution zone 630.

In some embodiments, the alert zone 635 is illuminated red in the display 600 to warn an operator where the alert zone 635 is located with respect to the speedometer needle 610. If the speedometer needle 610 moves to the right in FIG. 6 and into the alert zone 635, an alert warning 645 can be illuminated. The alert warning 645 is configured to be illuminated when the retarding performance speedometer needle 610 enters the alert zone 635. In some embodiments, the alert warning 645 is illuminated red and can be solid or flashing. In some embodiments, the alert warning 645 is also accompanied by an audible warning (e.g., a 0.5 second audible pulse for a 1.0 second period).

In the embodiment of the display 600 illustrated in FIG. 6, the display 600 also includes a speed change indicator 650. The speed change indicator 650 is configured to provide an indication to an operator that the vehicle 100 is either accelerating or decelerating. For large vehicles like the vehicle 100, it is often difficult to determine from human senses alone whether the vehicle 100 is accelerating or decelerating. The speed change indicator 650 provides visual indications of potentially imperceptible accelerations or decelerations. If the dial of the speed change indicator 650 rotates to the right (i.e., clockwise rotation), the vehicle 100 is accelerating. If the dial of the speed change indicator 650 rotates to the left (i.e., counter-clockwise rotation), the vehicle 100 is decelerating. The rotational (angular) speed of the speed change indicator 650 also corresponds to a value for the magnitude of the acceleration or deceleration. For example, a slow rotation of the speed change indicator 650 indicates a low value for acceleration or deceleration. A fast rotation of the speed change indicator 650 indicates a high value for acceleration or deceleration.

Figure 7:
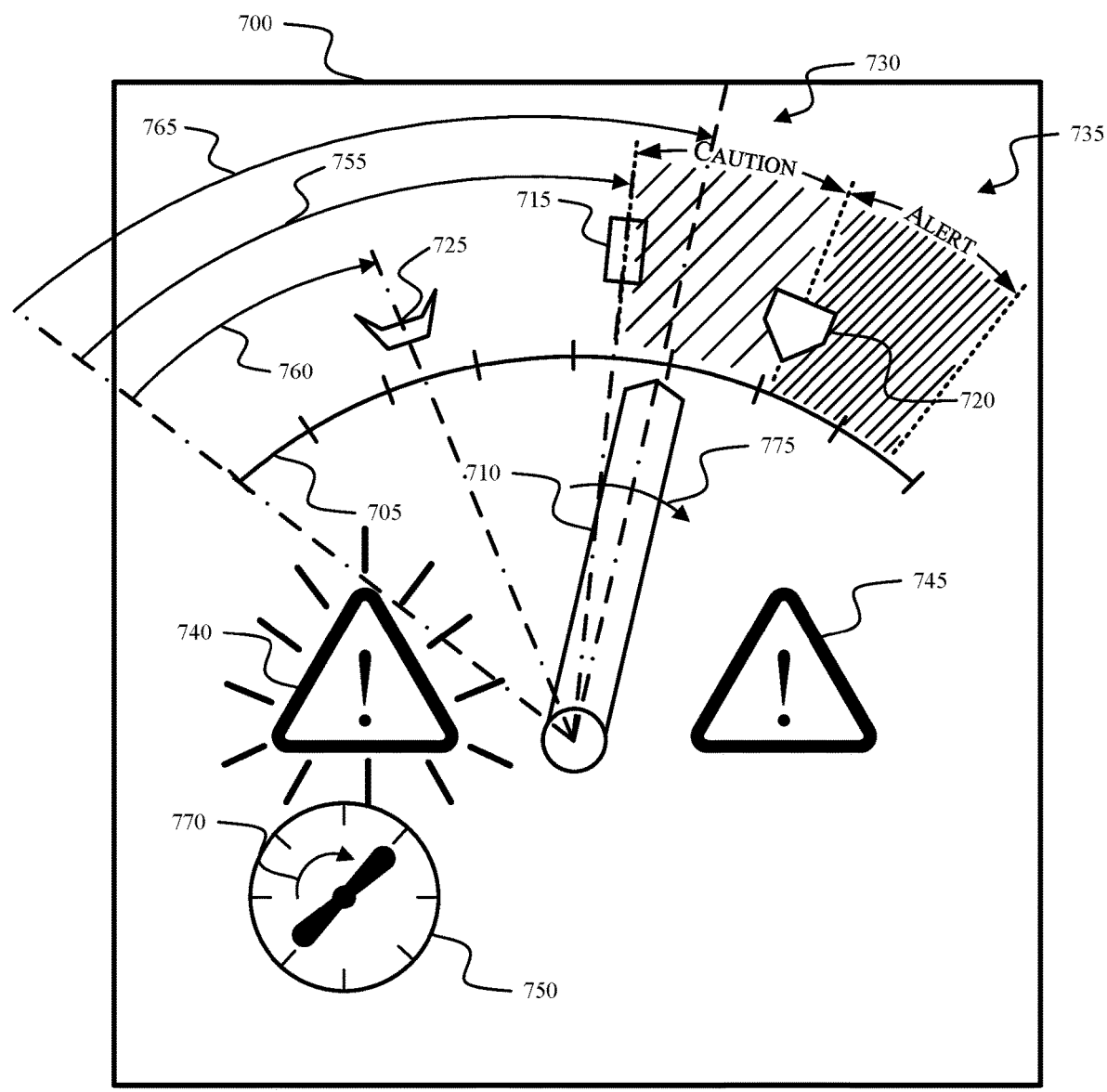
FIG. 7 illustrates operation of a display for the vehicle of FIG. 2A.

FIG. 7 illustrates an embodiment of a display 700 that more efficiently conveys the operational state of the vehicle 100 to an operator of the vehicle 100. The display 700 includes the same general components as the display 600 illustrated in FIG. 6, and corresponding components are numbered accordingly starting with a "7" rather than a "6." The corresponding components operate and perform the same functions as described above with respect to FIG. 6. Specifically, the display 700 includes a speed graph 705, a speedometer needle 710, a target speed indicator 715, an arrow indicator 720, a retarding performance indicator 725, a caution zone 730, an alert zone 735, a caution warning 740, an alert warning 745, and a speed change indicator 750. The display 700 also includes an angle of target speed 755, an angle of retard performance 760, an angle to actual speed 765, a rotation of speed change indicator 770, and an actual speed increase motion indicator 775. If the retarding performance indicator 725 moves to the left (i.e., counter-clockwise rotation) with respect to the speedometer needle 710, the retarding performance is slower than the actual speed of the vehicle 100. As a result, the speed of the vehicle 100 will increase (i.e., the vehicle will accelerate). The acceleration is illustrated as the motion indicator 775 to the right (i.e., clockwise rotation).

The relative resultant performance speed is illustrated as the angle of retard performance 760. The actual speed of the vehicle 100 is illustrated as the angle to actual speed 765. The position of the caution zone 730 and the alert zone 735 can be determined by the controller 300 based on the position of the arrow indicator 720. For example, the boundary between the caution zone 730 and the alert zone 735 can correspond to the current location of the arrow indicator 720. In some embodiments, the caution zone 730 is illuminated yellow in the display 700 to warn an operator where the caution zone 730 is located with respect to the speedometer needle 710. If, at full 100% retarding command, the retarding performance indicator 725 moves to the left (i.e., counter-clockwise motion) with respect to the target speed indicator 715, the retarding performance resultant speed shown by retarding performance indicator 725 is slower than the actual speed of the vehicle 100 shown by the speedometer needle 710. When this occurs, the caution warning 740 can be illuminated. Similarly, when the speedometer needle 710 reaches the caution zone 730 the caution warning 740 can be illuminated. When the speedometer needle 710 reaches the alert zone 735, the alert warning 745 can flash, the alert zone 735 can be illuminated, and an audible sound can be sequentially generated. In some embodiments, when full 100% retarding command is commanded and the retarding performance indicator 725 operation remains left (i.e., counter-clockwise from the target speed indicator 715), performance of the vehicle 100 is less than expected for the vehicle 100. In such embodiments, the caution warning 740 and the alert warning 745 can be activated (e.g., sequentially or in a defined pattern).

Figure 8:
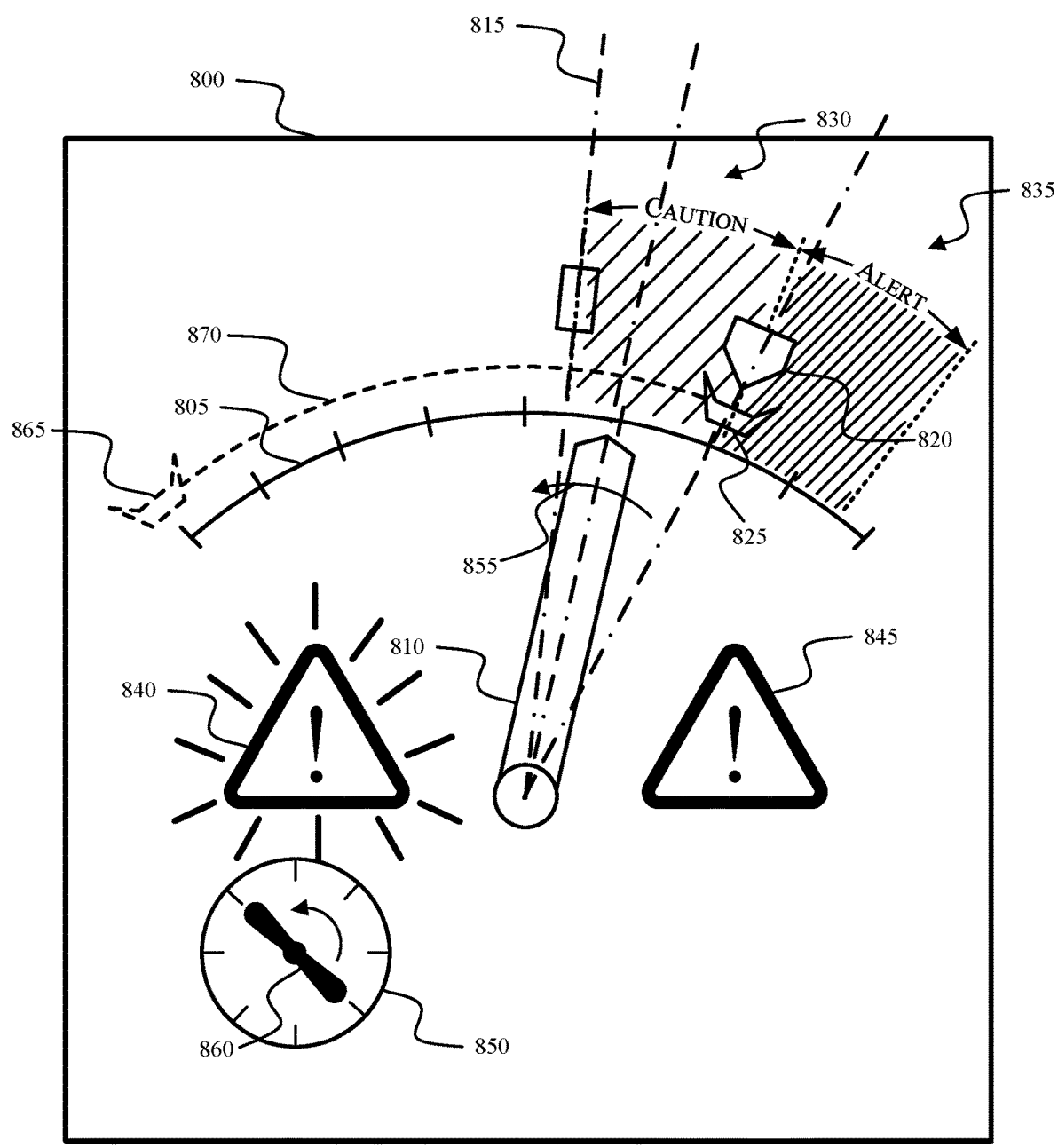
FIG. 8 illustrates operation of a display for the vehicle of FIG. 2A.

FIG. 8 illustrates an embodiment of a display 800 that more efficiently conveys the operational state of the vehicle 100 to an operator of the vehicle 100. The display 800 includes the same general components as the display 600 illustrated in FIG. 6, and corresponding components are numbered accordingly starting with a "8" rather than a "6." The corresponding components operate and perform the same functions as described above with respect to FIG. 6. Specifically, the display 800 includes a speed graph 805, a speedometer needle 810, a target speed indicator 815, an arrow indicator 820, a retarding performance indicator 825, a caution zone 830, an alert zone 835, a caution warning 840, an alert warning 845, and a speed change indicator 850. The display 800 also includes an actual speed decrease movement noted 855, a rotation of speed change indicator 860, a zero-level retarding performance indicator 865, and a zero-level to full-level retarding indicator 870.

In the embodiment illustrated in FIG. 8, the actual retarding performance indicator 825 is to the right (i.e., clockwise from the speedometer needle 810) and represents a retardation performance that is greater than what is required. As a result, the vehicle 100 will slow down, as indicated by the actual speed speedometer needle 810's counter-clockwise movement 855 and with the decrease of the speed as shown by speed change indicator 850 with counter clockwise rotation 860, to, for example, the target speed indicator 815.

Figure 9:
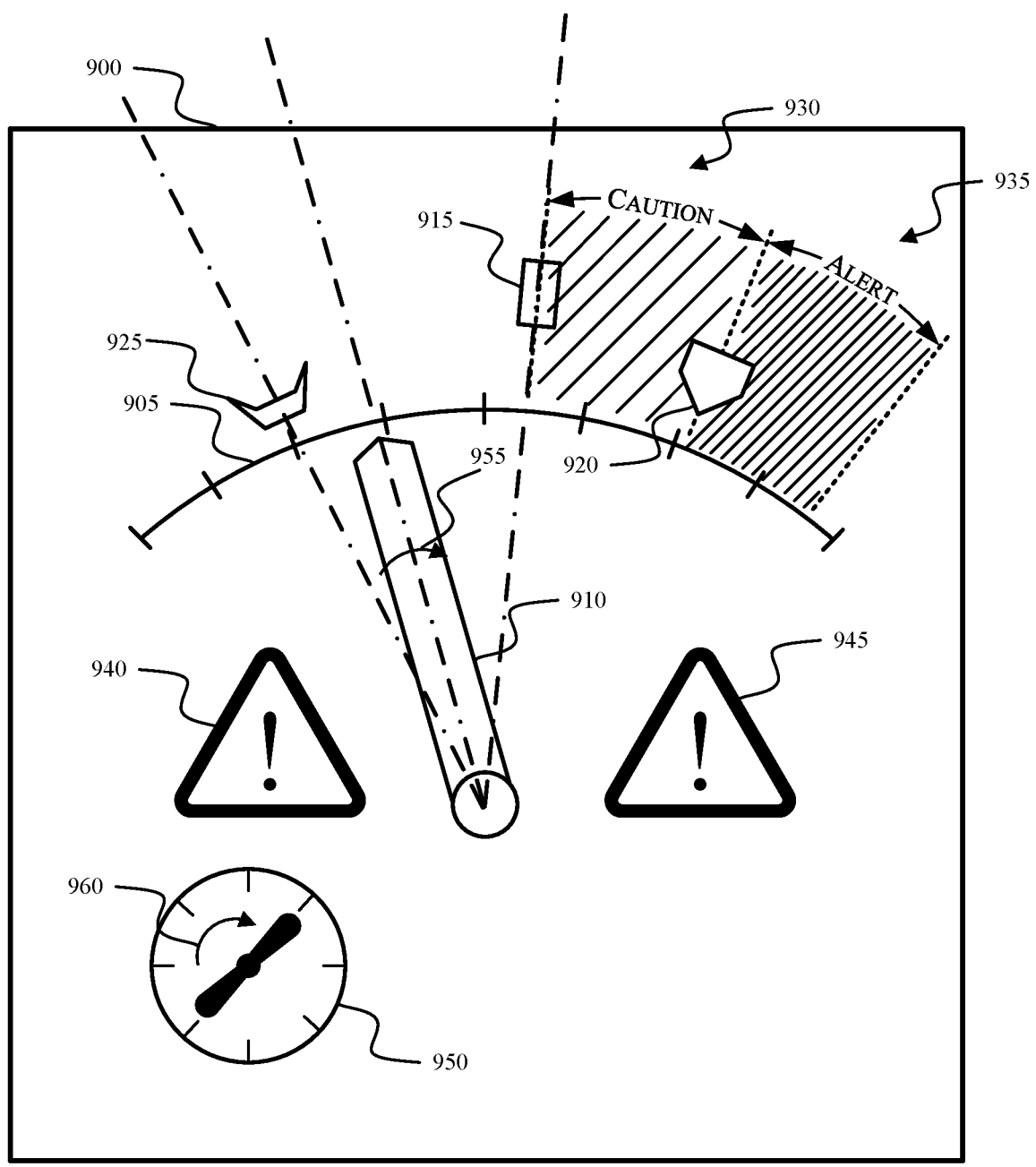
FIG. 9 illustrates operation of a display for the vehicle of FIG. 2A.

FIG. 9 illustrates an embodiment of a display 900 that more efficiently conveys the operational state of the vehicle 100 to an operator of the vehicle 100. The display 900 includes the same general components as the display 600 illustrated in FIG. 6, and corresponding components are numbered accordingly starting with a "9" rather than a "6." The corresponding components operate and perform the same functions as described above with respect to FIG. 6. Specifically, the display 900 includes a speed graph 905, a speedometer needle 910, a target speed indicator 915, an arrow indicator 920, a retarding performance indicator 925, a caution zone 930, an alert zone 935, a caution warning 940, an alert warning 945, and a speed change indicator 950. The display 900 also includes an actual speed change indicator 950 and a rotation of speed change indicator movement clockwise 960 of acceleration.

In the embodiment illustrated in FIG. 9, the actual retarding performance indicator 925 is to the left (i.e., counter-clockwise from the speedometer needle 910). However, the speedometer needle 910 is also left (i.e., counter-clockwise) from the target speed indicator 915. As a result, the vehicle 100 will speed up, as indicated by the actual speed change indicator 950 with its rotation movement clockwise 960 and speedometer needle 910 with movement clockwise 955.

Figure 10:
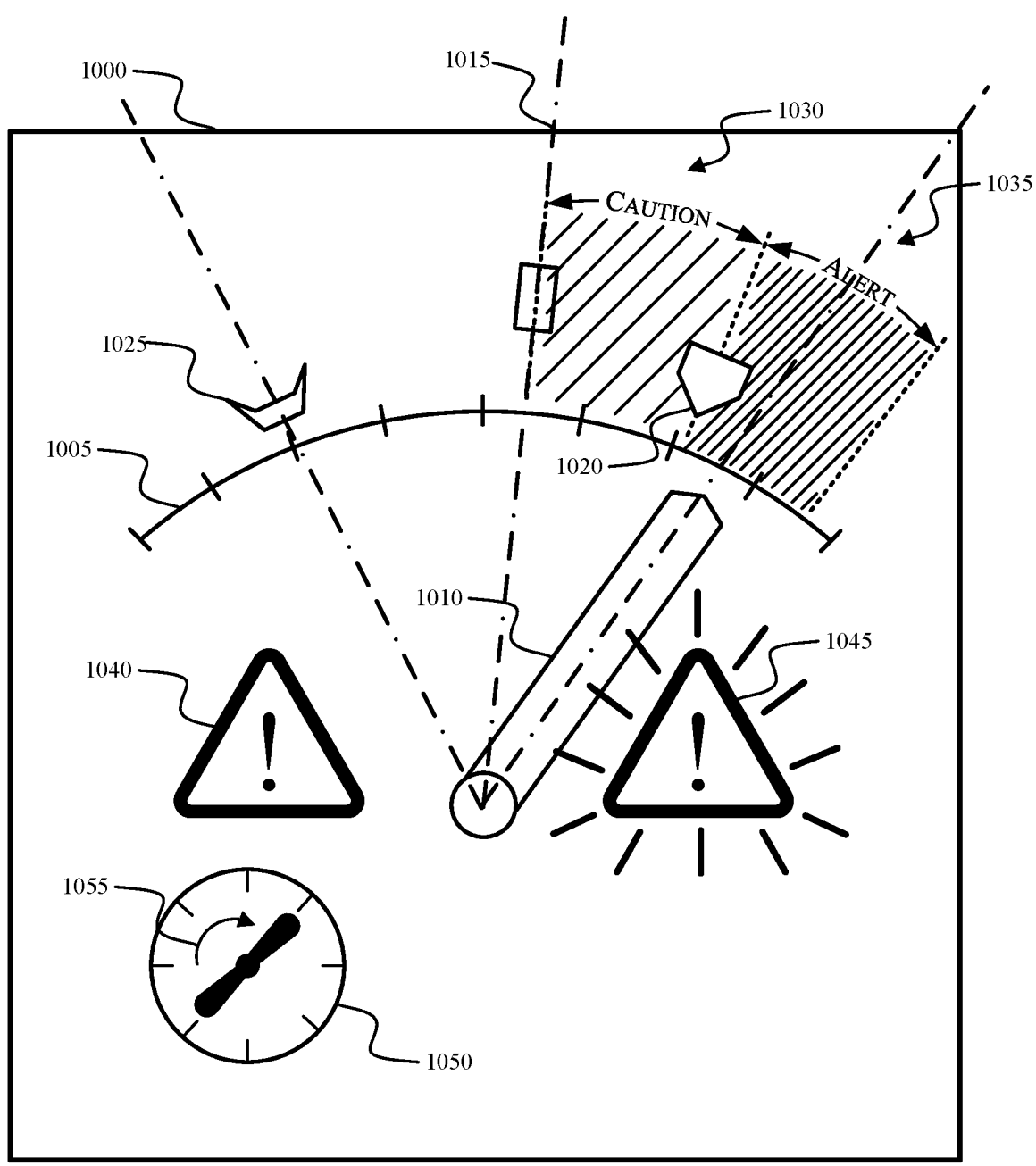
FIG. 10 illustrates operation of a display for the vehicle of FIG. 2A.

FIG. 10 illustrates an embodiment of a display 1000 that more efficiently conveys the operational state of the vehicle 100 to an operator of the vehicle 100. The display 1000 includes the same general components as the display 600 illustrated in FIG. 6, and corresponding components are numbered accordingly starting with a "10" rather than a "6." The corresponding components operate and perform the same functions as described above with respect to FIG. 6. Specifically, the display 1000 includes a speed graph 1005, a speedometer needle 1010, a target speed indicator 1015, an arrow indicator 1020, a retarding performance indicator 1025, a caution zone 1030, an alert zone 1035, a caution warning 1040, an alert warning 1045, and a speed change indicator 1050. The display 1000 also includes an actual speed change indicator 1050 and a rotation of speed change indicator movement clockwise 1055 of acceleration.

In the embodiment illustrated in FIG. 10, the actual retarding performance indicator 1025 is to the left (i.e., counter-clockwise from the speedometer needle 2010) and the speedometer needle 1010 is to the right (i.e., clockwise) from the arrow indicator 1020. As a result, the vehicle 100 is traveling too fast, and the speedometer needle 1010 is in the alert zone 1035. In this instance, the alert warning 1045 is illuminated, and the friction braking system of the vehicle 100 would be required (in addition to retarding effort) to slow down the vehicle 100.

In addition to the display 600 providing indications of operational parameters or characteristics of the vehicle 100, such as maximum retardation effort capability speed, target retardation effort speed, system performance retardation effort resultant zero acceleration speed, and vehicle speed, the display 600 can also be used for dynamic input parameters to automated controls for the vehicle 100. For example, it is desirable to maintain the target speed indicator 615 and the retarding performance indicator 625 in alignment with one another. An operator could press a button in the user interface 400 that locks the target speed indicator 615 and the retarding performance indicator 625 in alignment with one another. As a result, the controller 300 can automatically control the operation of the vehicle 100 such that the required retardation effort for the vehicle 100 will be controlled (e.g., by controlling speed) to match the target retardation effort. In some embodiments, the speedometer needle 610 is also locked into alignment with the target speed indicator 615 and the retarding performance indicator 625. In some embodiments, the vehicle 100's speed is controlled by the controller 300 to maintain alignment of the speedometer needle 610 and the target speed indicator 615, and the controller 300 is configured to determine if the retarding performance indicator 625 is in alignment using a command level of retarding that is expected to result from the position of the retarding performance indicator 625.

By automatically controlling the operation of the vehicle 100 based on available and required retardation effort, it is possible to semi-automate or fully-automate the operation of the vehicle 100. As noted previously, the potential for a runaway truck condition is among the most dangerous conditions to account for with the vehicle 100. Traditionally, the condition was avoided based on an operator's skill and experience with the vehicle 100. By instead controlling the operation of the vehicle based on the available and required retardation effort directly, the need for highly-skilled or experienced operators can be reduced. For example, with the display 600, an operator physically located in the vehicle 100 or an operator remotely located from the vehicle 100 (e.g., at workstation 215 [see FIG. 2B]) can base travel speed decisions on amounts of required and available retardation effort.

In some embodiments, the controller 300 and/or the server 210 can similarly, automatically or autonomously control the vehicle 100 such that the amount of required retardation effort never exceeds the available retardation effort. Such an ability can be combined with knowledge of terrain or particular travel routes of the vehicle 100 to achieve semi-autonomous or fully-autonomous control. For example, the server 210 or controller 300 can receive information related to a predetermined route of the vehicle 100 from a location where the vehicle 100 is loaded to a location where the vehicle 100 is emptied. Such information can be provided from a third-party service (e.g., Google Maps) or can be learned over time. For example, each time the vehicle 100 traverses a particular route, all of the location information (e.g., GPS coordinates), inclination information, payload information, etc., is stored or logged in the database 220, the database 415, or both. Using the location information and the information about the inclination of the vehicle 100 along the route, the controller 300 and/or the server 210 is able to predict changes in road grade that are about to occur along the route. The controller 300 or server 210 can then preemptively control the vehicle 100 to ensure that the amount of retardation effort required along the known route never exceeds the amount of retardation effort available along the route.

As an illustrative example, a section of a route can have three portions. The first portion of the route section is relatively flat and the amount of retardation effort required is somewhat low. However, the second portion of the three portions has a decline. To account for the upcoming decline and ensure enough retardation effort is available on the decline, the vehicle 100 can be preemptively slowed down (e.g., reduce pedal percentage, apply retardation force, etc.) before a larger equivalent grade effect force forward is encountered (i.e., before the larger retardation force is required). If the third portion of the route section is relatively flat like the first portion of the route section, the vehicle will again have sufficient retardation effort based on the available retardation effort from the second portion of the route section. As a result, the controller 300 and/or the server 210 are configured to preemptively control the vehicle 100 to account for future expected or predicted changes in the requirements for retardation effort. In some embodiments, the database 220 and/or the database 415 are populated with aggregated knowledge of frequently traveled routes. The knowledge base of known, existing travel routes for the vehicle 100 can be distributed to a fleet of vehicles 100 (see FIG. 2B). Based on the known locations of the vehicles 100 and known routes of the vehicles 100, each vehicle 100 in the fleet can be configured to perform the same retardation effort control.

Figure 11:
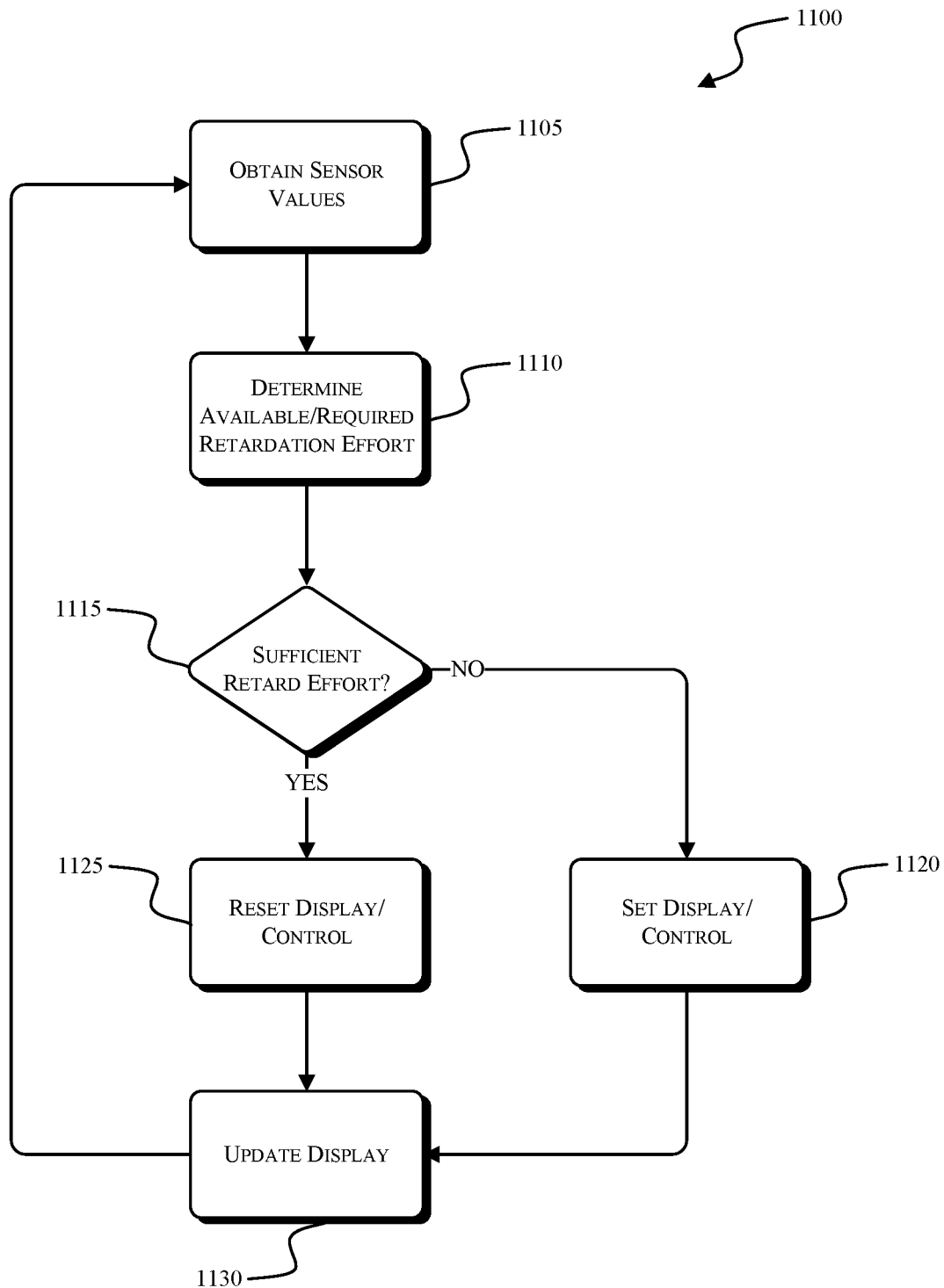
FIG. 11 is a process for displaying and controlling operational conditions of the vehicle of FIG. 2A.

FIG. 11 is a process 1100 for controlling the vehicle 100 based on a required amount of retardation effort. The process 1100 is capable of being implemented by a computer, such as the controller 300. The process 1100 begins with the controller 300 obtaining values based on output signals from the sensors 410 of the vehicle 100 (STEP 1105). The sensors 410 include, for example, a payload sensor, a speed sensor, an inclination sensor, etc. As described above with respect to FIG. 5, the controller 300 is configured to use the sensor values to determine a required retardation effort and an available retardation effort to prevent the vehicle from accelerating (STEP 1110). If, at STEP 1115, the available retardation effort is not sufficient to prevent the vehicle 100 from accelerating, the controller 300 controls the display 600 (see FIG. 6) and/or the operation of the vehicle accordingly (STEP 1120). For example, in the display 600, the retarding performance indicator 625 would be positioned in the alert zone 635 and the alert warning 645 would be illuminated. The controller 300 can selectively apply the friction braking system to slow the vehicle 100 down to a speed where sufficient retardation effort is available. If, at STEP 1115, the available retardation effort is sufficient to prevent the vehicle 100 from accelerating, the controller 300 controls the display 600 and/or the operation of the vehicle accordingly (STEP 1125). For example, in the display 600, the retarding performance indicator 625 would be positioned before or in the caution zone 630. Depending upon whether the retarding performance indicator 625 is in the caution zone 630, the caution warning 640 can be illuminated. In some embodiments, if the retarding performance indicator 625 is in the caution zone 630, the controller can automatically apply retardation effort to the retarder device or apply the friction braking system to slow the vehicle 100 to move the retarding performance indicator 625 out of the caution zone 630. In some embodiments, an operator manually applies the retardation effort to the retarder device based on an input to the user interface 400. In the event that, for example, the retarding performance indicator 625 leaves the alert zone 635 and enters the caution zone 630 (e.g., after the friction braking system has been applied), the display 600 can be reset to reflect the changes in status. Following any changes to the display 600 determined to be required at STEP 1120 or STEP 1125, the display 600 is updated to reflect the real-time or substantially real-time status of the vehicle 100. The process 1100 then returns to STEP 1105 where new sensor output signals are received and evaluated by the controller 300.

Thus, embodiments described herein provide, among other things, vehicles, methods, and devices for vehicle retarder control and display. Various features and advantages are set forth in the following claims.

What is claimed is:

1. An industrial vehicle comprising:
a speed sensor configured to generate a speed sensor signal;
a payload sensor configured to generate a payload sensor signal;
an inclination sensor configured to generate an inclination sensor signal;
a wheel motor connected to a wheel of the industrial vehicle, the wheel motor including an electric retarder device for applying a retardation force to the wheel; and
a controller connected to the speed sensor, the payload sensor, the inclination sensor, and the wheel motor, the controller configured to:
receive the speed sensor signal,
receive the payload sensor signal,
receive the inclination sensor signal,
determine a required retardation force for the industrial vehicle based on the payload sensor signal and the inclination sensor signal,
determine an available retardation force for the industrial vehicle based on the speed sensor signal, and
generate an output indicating the required retardation force for the industrial vehicle relative to the available retardation force for the industrial vehicle, the output including a first indicator configured to indicate the available retardation force, the output including a second indicator configured to indicate a present speed of the industrial vehicle, the output including a warning zone to indicate that the required retardation force is greater than the available retardation force,
wherein the first indicator is configured to move relative to the second indicator to illustrate the required retardation force relative to the available retardation force,
wherein the first indicator and the second indicator are configured to move relative to the warning zone to illustrate whether the industrial vehicle is travelling too fast for the available retardation force, and
wherein the electric retarder device of the wheel motor is controlled to apply the retardation force to the wheel of the industrial vehicle.

2. The industrial vehicle of claim 1, further comprising a network communications module for communicating over a network.

3. The industrial vehicle of claim 1, the controller further configured to:
generate the output indicating a target retardation force for the industrial vehicle relative to the available retardation force for the industrial vehicle.

4. The industrial vehicle of claim 3, the controller further configured to:
generate the output indicating a first warning when the required retardation force is greater than the target retardation force and less than the available retardation force; and
generate the output indicating a second warning when the required retardation force is greater than the available retardation force.

5. The industrial vehicle of claim 4, the controller further configured to:
generate the output indicating an acceleration or deceleration of the industrial vehicle.

6. The industrial vehicle of claim 1, the controller further configured to:
automatically control the electric retarder device of the wheel motor to apply the retardation force to the wheel of the industrial vehicle.

7. The industrial vehicle of claim 6, wherein the retardation force is applied preemptively to the electric retarder device of the wheel motor.

8. The industrial vehicle of claim 6, wherein the retardation force prevents the industrial vehicle from accelerating.

9. A computer-implemented method of controlling operation of an industrial vehicle, the industrial vehicle including a wheel and a wheel motor, the wheel motor including a retarder device, the method comprising:
receiving a speed sensor signal from a speed sensor;
receiving a payload sensor signal from a payload sensor;
receiving an inclination sensor signal from an inclination sensor;
determining a required retardation force for the industrial vehicle based on the payload sensor signal and the inclination sensor signal;
determining an available retardation force for the industrial vehicle based on the speed sensor signal;
generating an output indicating the required retardation force for the industrial vehicle relative to the available retardation force for the industrial vehicle, the output including a first indicator indicating the available retardation force, the output including a second indicator indicating a present speed of the industrial vehicle, the output including a warning zone to indicate that the required retardation force is greater than the available retardation force,
wherein the first indicator moves relative to the second indicator to illustrate the required retardation force relative to the available retardation force,
wherein the first indicator and the second indicator move relative to the warning zone to illustrate whether the industrial vehicle is travelling too fast for the available retardation force, and controlling the electric retarder device of the wheel motor to apply a retardation force to the wheel of the industrial vehicle.

10. The computer-implemented method of claim 9, further comprising:
communicating over a network using a network communications module.

11. The computer-implemented method of claim 9, further comprising:
generating the output indicating a target retardation force for the industrial vehicle relative to the available retardation force for the industrial vehicle.

12. The computer-implemented method of claim 11, further comprising:
generating the output indicating a first warning when the required retardation force is greater than the target retardation force and less than the available retardation force; and
generating the output indicating a second warning when the required retardation force is greater than the available retardation force.

13. The computer-implemented method of claim 12, further comprising:
generating the output indicating an acceleration or deceleration of the industrial vehicle.

14. The computer-implemented method of claim 9, further comprising:
automatically controlling the retarder device of the wheel motor to apply the retardation force to the wheel of the industrial vehicle.

15. The computer-implemented method of claim 14, wherein the retardation force prevents the industrial vehicle from accelerating.

16. A computing system for controlling operation of an industrial vehicle, the computing system configured to:
receive a speed sensor signal from a speed sensor;
receive a payload sensor signal from a payload sensor;
receive an inclination sensor signal from an inclination sensor;
determine a required retardation force for the industrial vehicle based on the payload sensor signal and the inclination sensor signal;
determine an available retardation force for the industrial vehicle based on the speed sensor signal; and
generate an output indicating the required retardation force for the industrial vehicle relative to the available retardation force for the industrial vehicle, the output including a first indicator configured to indicate the available retardation force, the output including a second indicator configured to indicate a present speed of the industrial vehicle, the output including a warning zone to indicate that the required retardation force is greater than the available retardation force,
wherein the first indicator is configured to move relative to the second indicator to illustrate the required retardation force relative to the available retardation force,
wherein the first indicator and the second indicator are configured to move relative to the warning zone to illustrate whether the industrial vehicle is travelling too fast for the available retardation force, and
control an electric retarder device of a wheel motor to apply a retardation force to the wheel of the industrial vehicle.

17. The computing system of claim 16, the computing system further configured to:
generate the output indicating a target retardation force for the industrial vehicle relative to the available retardation force for the industrial vehicle.

18. The computing system of claim 17, the computing system further configured to:
generate the output indicating a first warning when the required retardation force is greater than the target retardation force and less than the available retardation force; and
generate the output indicating a second warning when the required retardation force is greater than the available retardation force.

19. The computing system of claim 18, the computing system further configured to:
generate the output indicating an acceleration or deceleration of the industrial vehicle.

20. The computing system of claim 16, the computing system further configured to:
automatically control the retarder device of the wheel motor to apply the retardation force to the wheel of the industrial vehicle.

\* \* \* \* \*